No. 822,802. PATENTED JUNE 5, 1906.
J. WILKINSON.
SHAFT PACKING.
APPLICATION FILED NOV. 24, 1905.
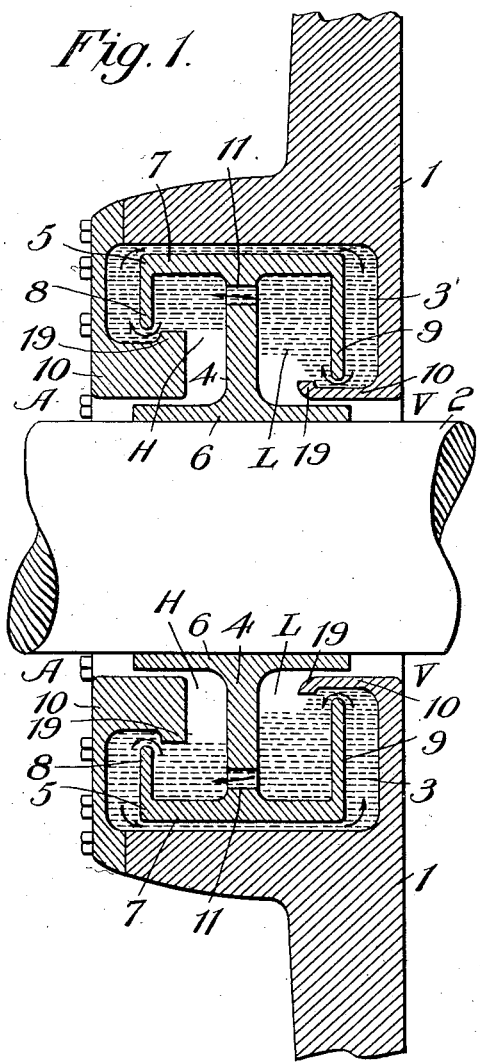
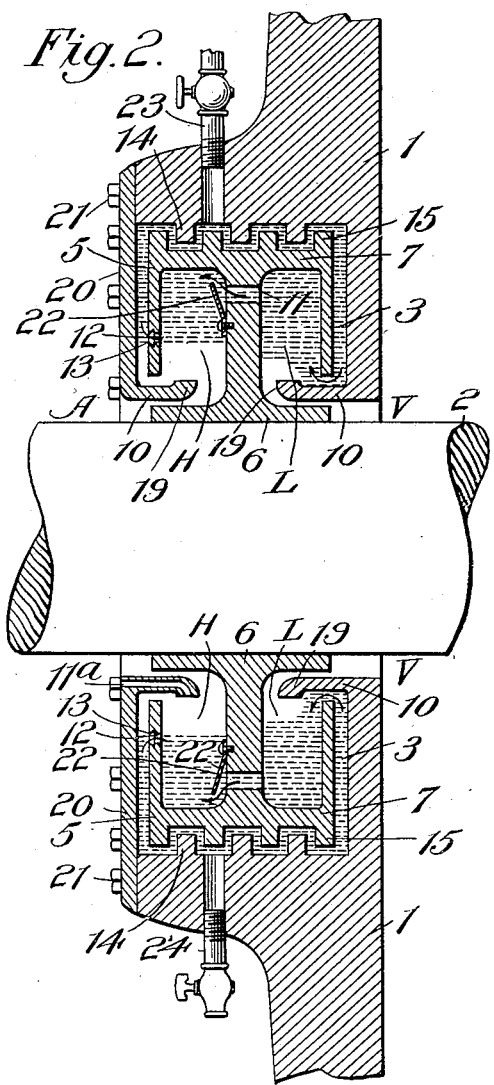
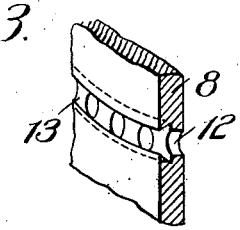
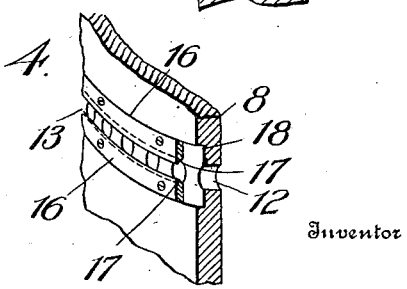
Witnesses
Edwin L. Bradford
P. H. Burch
Inventor
James Wilkinson
By Robt Johnston Jr.
Attorney

UNITED STATES PATENT OFFICE.

JAMES WILKINSON, OF PROVIDENCE, RHODE ISLAND, ASSIGNOR TO WILKINSON TURBINE COMPANY, A CORPORATION OF ALABAMA.

SHAFT-PACKING.

No. 822,802.      Specification of Letters Patent.      Patented June 5, 1906.

Application filed November 24, 1905. Serial No. 288,963.

*To all whom it may concern:*

Be it known that I, JAMES WILKINSON, a citizen of the United States, residing at Providence, in the county of Providence and State of Rhode Island, have invented new and useful Improvements in Shaft-Packing, of which the following is a specification.

My invention relates to improvements in liquid packing means for the shafts of rotary motors—such as turbines, centrifugal pumps, &c.

My invention consists in a shaft-packing having no mechanical contacts or close clearances between stationary and rotating parts, a liquid being used to seal the joint. Such a packing will have no parts to wear or keep in alinement, is unaffected by ordinary differences of adjustment of parts due to expansion and contraction, is small in size and economical to construct, and is very effective, particularly where high shaft-speeds obtain. The packing is best adapted for use between small differences in pressure, such as from fifteen to twenty-five pounds per square inch, through it may be compounded for higher pressures with satisfactory results, or it may be designed for use where very small differences of pressure exist, such as one-half or one pound.

In the designs which I have chosen to illustrate my invention in its simplest form an element rotatable with the shaft is disposed within an annular chamber supplied with a body of sealing liquid and exposed at opposite ends to the different pressures between which the packing takes effect. The rotating element rotates in close proximity to the inner circumferential wall of the chamber, leaving a slight radial clearance between said parts for the flow in an axial direction of the circulating body of liquid in the chamber, this flow being induced by the difference in the pressures acting upon the liquid and maintained by the pumping action of the rotating element, the volume flowing being regulated by the cross-sectional area of the circulation-openings in the element or by the cross-sectional area of the clearance between moving and stationary parts. Thus, broadly speaking, the rotating element through its pumping action produces an axial circulation of the liquid in the nature of a local action, the axially-circulating body of sealing liquid flowing through the clearance between the moving and stationary parts and acting to seal the joint. The greater the difference in pressure the more rapid will be the circulation.

A further development of my invention embraces the use of a centrifugal pump of novel form for maintaining a continuous circulation of the same body of sealing liquid under various different pressures, which acts automatically to prevent a backflow of the liquid through its passage or passages and when in operation causes the liquid to check the flow of air or vapor through it in either direction. This is best effected by providing the element with annular side flanges leading from its periphery beyond the circulation-openings or pumping-passages toward the shaft and forming two annular chambers, the bodies of liquid in which are exposed to different pressures. In this construction the body of sealing liquid circulates freely between the element and its chamber, as above described, passing around or through the flanges and entering the rotating chambers in the element, where centrifugal effect is obtained to seal the circulation-openings inside the pump between the chambers by forcing the liquid continuously through these openings against the higher pressure.

As a further development of my invention I may provide the flange or the high-pressure side of the element with an annular jet-orifice opposite or above the normal level of the water therein. The circulating body of liquid flows through this orifice in an annular jet, which acts to uniformly prime the annular clearance between the rotating element and its casing. This priming liquid, due to the drop in pressure toward the low-pressure end of the packing, will flow in an annular belt around the element and into the low-pressure pumping-chamber, where it is again subjected to the action of the pump and forced through the annular chambers and jet-orifice, thus establishing a continuous axial circulation of the sealing liquid. The body of water in the low-pressure chamber being larger, due to the incoming water and the opposing pressure, will have a height or head over the water in the adjacent chamber and under a given speed of rotation will be compressed by centrifugal action until its pressure exceeds that of the higher pressure to which liquid in the high-pressure chamber is exposed, thus causing the liquid to flow.

The pump thus continually circulates the liquid, keeping the clearance primed and preventing the entrance of air into the turbine. To retard the flow of the liquid between the periphery of the element in the chamber and keep the volume of circulating liquid necessary to pack or prime the joint small, I provide either part with baffle-plates or both parts with annular projections forming an interleafed gland or tortuous passage, both of which constructions will act to retard the flow of the liquid, and thus reduce the volume of sealing fluid needed. Where several turbines are provided with my packing at their exhaust ends, which are connected to the same condenser, it is desirable to provide means for sealing the packing-joint of any turbine of the set when not running. This may be effected in one way by providing check-valves for the circulation-ports which open toward the atmosphere and providing a means to force water into the tortuous gland so as to flush and seal it.

As applied to elastic-fluid turbines my invention is particularly adapted for packing against the atmosphere at the low-pressure end and in combination with other packing devices to pack against the atmosphere at the high-pressure end.

It is also adapted for use in multistage-turbines having comparatively small drops in pressure between stages to pack the joint between the diaphragms and the shaft.

My invention further comprises the details of construction and arrangements of parts as illustrated in the several figures of the drawings.

Referring to the drawings, Figure 1 illustrates a rotating element provided with communicating chambers in which the circulating fluid under centrifugal pressure seals the circulation-ports and flows from the high-pressure chamber into the clearance between the element and the casing to seal the cavity or joint. Fig. 2 represents my preferred construction and discloses a rotary element similar to Fig. 1, but provided with a tortuous circulating-passage between the element and its casing. Figs. 3 and 4 are detail views illustrating two forms of the annular jet-nozzle from which the circulating fluid flows from the high-pressure chamber in the casing or clearance.

Similar reference characters refer to similar parts throughout the drawings.

1 represents the stationary element, such as the exhaust-head, of a rotary motor which surrounds the shaft 2 at a point where it is desired to pack the latter. This element 1 is provided with an annular packing chamber or casing 3, having an annular opening next to the shaft, through which the web 4 of the packing device 5 passes. The web 4 is integral with the hub 6 and a wide annular rim 7, which rotates in close proximity to the outer wall of the casing 3. I provide circulation or pumping passages in said device, preferably by providing its rim 7 with annular flanges 8 and 9, which may be integral or connected thereto and which project inwardly toward the shaft, extending to a point close to the flange portions 10, forming the inner wall of the casing. As shown in Fig. 1, these flanges may be of different radial widths, in which case the flange 10 opposite the shorter flange 8 is thickened. The web 4 is provided with one or more openings 11 near the rim 7.

The letters A and V represent, respectively, the high and low pressures between which the packing acts. Any desired packing liquid may be introduced through the port 11$^a$ into the high-pressure chamber H in the packing device. As the device, which is fast on the shaft, rotates this liquid flows through the ports 11 to seek its level in the other chamber L. The speed of rotation and the difference in pressures will determine the volume and the difference in the level between the bodies of liquid in the two chambers. The greater volume of water will be in the chamber L, its excess over that in chamber H being such that under a given speed of rotation its centrifugal force will overcome the higher pressure in chamber H and cause the liquid to flow from chamber L into chamber H and thence around the flange 8, Fig. 1, or through ports 12 therein, Fig. 2, into the casing. As the liquid leaves the chamber H it is relieved of the centrifugal effect and will therefore offer more resistance to the pressure A. The pressure A tends to force it toward the outer wall of the casing and around the rim and flange 9 toward the low pressure V. After the liquid passes between the flanges 9 and 10 it is caught by chamber L and again subjected to the centrifugal effect of the rotating device 2 and forced, as by a pump, through the ports 11 into chamber H to continue the circulation. The purpose of these flanges is to form two communicating chambers or passages H and L, which when rotated act as a centrifugal pump to cause a circulation of the packing liquid sufficient to staunch the joint 3. These chambers need not be annular, but may be arranged in pairs connected by ports 11 or may consist of passages leading from one side of the hub to the other in a manner to give a centrifugal pumping effect to liquid therein.

In its broadest sense my invention contemplates the provision of a centrifugal pump which will cause a continuously-circulating body of sealing liquid to flow against a head of pressure equal to the difference in pressures per square inch between which the packing is interposed, this body of liquid being used to effectively seal all clearances in the packing as well as the ports or passages in the pump. To this extent, therefore, the details of construction may be varied within the scope of my invention. Thus the flange 8 could be shortened, as in Fig. 1, to the point where the ports 12, Fig. 2, are formed therein; but as this would tend to further unbalance the packing device 2 I prefer to extend the flange 8 as near the shaft as possible.

The ports 12 may be of any desired character; but I prefer to have them open into an annular jet-orifice 13, whose cross-sectional area is approximately that of the ports supplying liquid thereto. This construction provides for the discharge of the packing liquid in an annular jet into the casing and insures an equal distribution of the liquid to form the axially-flowing belt which seals the clearance between the rim 7 and the casing.

In Fig. 2 I show the outer wall of the casing provided with a plurality of projecting annular ribs or rings 14, interposed between similar ribs or rings 15 on the rim 7. The radial clearance between the stationary and rotating parts is as close as in Fig. 1, being as small as is practicable in both instances. The axial clearances are sufficient to permit normal end play of the shaft without contact of the parts. I thus provide a tortuous passage which materially retards the flow of the liquid belt over the rim, due to the drop in pressures between A and V, and reduces the volume of liquid, which would otherwise be necessary for the pump to circulate to insure the sealing of the joint. Obviously other means for retarding may be used, such as a small clearance between the flanges 9 and 10, which would throttle the stream at this point. Also the volume of the liquid in circulation may be varied by changing the area of the circulation-ports.

In Fig. 3 I show the annular jet-orifice formed by two detachable rings 16, having reversely-tapered edges 17. These rings are set into an annular channel 18 in the outer face of the flange 8, into which the ports 12 open. The flanged portions 10 are provided with turned-up shoulders 19 at their adjacent ends, which act, as shown on the low-pressure side, to direct the circulating stream into the chamber L or around the flange 8, Fig. 1. A plate 20, forming a side wall of the casing 3, may be attached to the element 1 by cap-screws 21 to permit assembling. Where it is desired to provide means to seal the joints against the atmosphere when the packing is exposed to the pressure V, which may be a vacuum, and the turbine is not in operation, I place flap-valves 22 on the high-pressure sides of the ports 12 to seal them and introduce water or other liquid through a pipe 23 into the tortuous gland at or near its high-pressure end. The liquid will flush the gland and as it flows therethrough toward the lower pressure will seal it against air leaking in. The valves 22 will not interfere with the circulation during running operation, as they are only held to their seats by the pressure A and will therefore be opened by the pump-pressure. I provide a drain-pipe 24 for the packing-chamber.

The details of construction hereinbefore described illustrate the principle of operation involved in my improved packing. They are not to be construed as limiting the invention as hereinafter claimed.

What I claim as new, and desire to secure by Letters Patent, is—

1. A liquid packing for rotating shafts comprising in combination, a chamber around the shaft, a rotatable element within said chamber, and a circulating body of liquid acted upon by said element to produce a continuous axial circulation thereof in said chamber under a head of pressure exceeding the differential in the pressures between which the packing is disposed.

2. In a liquid packing means for rotating shafts, a centrifugal pump driven by the shaft, a pump-chamber surrounding the shaft, and a body of liquid in said chamber which is acted upon by said pump and by the pressures to which it is exposed to induce an axial circulation thereof between said pump and chamber which seals all openings or clearances in or around said pump for the purposes specified.

3. The combination with a rotating shaft and a stationary element surrounding it, of an annular chamber in said element also surrounding said shaft, an annular element rotatable with said shaft and having a rim which rotates in close proximity to the circumferential wall of said chamber, one or more passages leading through said element from its low to its high pressure side, and an axially-circulating body of liquid in said chamber which enters said passages at their low-pressure ends and is forced through them by centrifugal action against the higher pressure to which the liquid is exposed to maintain the circulation of said liquid, for the purposes described.

4. In a liquid packing means for a rotating shaft, a chambered element rotatable with the shaft, liquid in the chambers exposed to different pressures and subjected to centrifugal action by rotation with said element, a port in said element connecting said chambers, and a stationary chamber in which said element rotates and induces an axially-flowing belt of circulating liquid to seal the clearance between the element and chamber, substantially as described.

5. In a liquid packing means for a rotating shaft, an element rotatable with said shaft and exposed to different pressures, a conduit rotatable with said element and exposed to said pressures, a chamber in which said element rotates, and a body of sealing liquid therein which circulates in said chamber around said element and through said conduit in the manner and for the purposes described.

6. In a liquid packing means for a rotating shaft, a chamber around said shaft, an element rotatable with said shaft and disposed in said chamber, a body of sealing liquid in said chamber acted upon by the pressures to which it is exposed and by said element to produce an axial circulation thereof for the purposes described, and means to throttle the stream of circulating liquid.

7. In a liquid packing means for a rotating shaft, a chamber around said shaft, an annular element rotatable with the shaft and disposed in said chamber, a liquid exposed to different pressures and continuously acted upon by said element to produce a constantly-flowing belt of liquid which circulates axially around the periphery of said element between said element and chamber, and means to retard the flow of said body of liquid, as and for the purposes described.

8. In liquid packing means for a rotating shaft, a chamber around said shaft, an element rotatable with the shaft and disposed in said chamber, projections on said chamber and element which form a tortuous passage, and a sealing liquid upon which said element acts continuously to produce an annular axially-circulating body or belt of liquid flowing through said tortuous passage, for the purposes described.

9. In a liquid packing means for a rotating shaft, a stationary chamber around said shaft, an element rotatable with the shaft and provided with two annular rotating chambers opening toward said shaft and disposed within said stationary chamber, means to establish communication between said rotating chambers near their outer peripheries, a liquid in said chambers subjected to centrifugal effect by their rotation, means to discharge the liquid in a substantially annular stream from the rotating chamber exposed to the higher pressure, said annular body of fluid being acted upon by said higher pressure and caused to flow back to the low-pressure rotating chamber and in its passage to seal the joint between said rotating element and stationary chamber.

10. In a liquid packing means for a rotating shaft, a rotating element provided on each side with annular chambers, means to establish communication between said chambers through said element, bodies of liquid in said chambers exposed to different pressures, an annular jet-orifice in the outer side wall of the chamber exposed to the higher pressure, the centrifugal effect on said bodies of liquid being such as to cause the discharge of an annular jet through said orifice, and a stationary chamber in which said element rotates, the joint between said latter chamber and element being sealed by the flow of said annluar jet of liquid induced by the difference in pressures to which the liquid is exposed.

11. In a liquid packing means for a rotating shaft, an annular chamber surrounding said shaft, an element rotatable with said shaft, a body of liquid in said chamber, and a circulating-passage for said liquid formed by the clearance between said element and stationary chamber and by one or more ports in said element, said element being adapted to act as a centrifugal pump to maintain the circulation of the liquid through said passage to seal it.

12. In a liquid packing means for a rotating shaft, an annular chamber surrounding said shaft, an element rotatable with said shaft, a body of liquid in said chamber, a circulating-passage for said liquid formed by the clearance between said element and stationary chamber and by one or more ports in said element, said element being adapted to act as a centrifugal pump to maintain the circulation of the liquid through said passage to seal it, valves for said ports which are opened by the circulating liquid toward a pressure which closes them when the element ceases to rotate, means to produce a tortuous passage in the clearance between said element and chamber, and means to introduce liquid into said tortuous passage to flush and seal it, for the purposes described.

In testimony whereof I have hereunto set my hand in presence of two subscribing witnesses.

JAMES WILKINSON.

Witnesses:
JAMES H. NOLAN,
JOHN CASHMAN.